3,723,137
METHOD OF FORMING A CONTINUOUS
ADHERENT BATTER ON A FOODPIECE

Leonard G. Fischer, College Point, Monroe B. Sherain, Brooklyn, and Nancy A. Cornacchio, Bronx, N.Y., Bernard J. Entner, Nutley, N.J., and Ferdinand E. Pettinato, Bronx, N.Y., assignors to DCA Food Industries, Inc., New York, N.Y.
No Drawing. Continuation-in-part of application Ser. No. 39,154, May 20, 1970. This application Nov. 22, 1971, Ser. No. 200,852
Int. Cl. A22c 18/00, 25/00; B65b 33/00
U.S. Cl. 99—166
5 Claims

ABSTRACT OF THE DISCLOSURE

Adherent, continuous coating compositions for fried and baked food products are formed from a combination of ingredients including at least 3 wt. percent gelatinized starch. The batter coatings are formed directly on the food piece by a novel method including the steps of wetting a bare food piece with a fluid, dipping the wet piece in the dry coating composition and immersing the coated piece in a fluid to form a dripless batter directly on the food piece.

---

This is a continuation-in-part of U.S. patent application Ser. No. 39,154, filed May 20, 1970 and now abandoned.

The present invention relates generally to improved comestible coatings and methods. More particularly, the present invention is concerned with novel coating compositions for fried and baked food products and to novel methods of applying such coating compositions.

It is conventional in the frying of foodstuffs, such as meat, fish, fruit or vegetables, by deep fat frying or by frying in shallow oil, to preliminarily coat the foodstuff with a batter and a breading material which may or may not have been precooked. The procedure usually involved the initial coating of the foodstuff with a liquid batter and then applying a particulate farinaceous material or breading to the batter-covered surface. The coated product is then either fried, or frozen and stored to be fried at a later date. An alternative method involves the dipping or immersion of the food piece in a highly viscous batter and directly frying this coated food piece.

The above described coating compositions as well as the methods of applying them suffer from numerous disadvantages. One disadvantage is the time and labor required to prepare a liquid batter from dry ingredients and water. A second disadvantage is the tendency for non-soluble ingredients to settle out of the liquid phase, and therefore some mechanical circulating or agitating device is required. If leavening is present, the liquid batter must also be cooled to reduce the reaction rate of the leaveners in the liquid phase and to control microbial growth.

A third disadvantage results from the relatively narrow range of fluidity in which the food product will pick up sufficient liquid batter. That is, the liquid batter must be sufficiently thick to cause enough batter to cling to the food piece, but must be sufficiently thin to coat the food piece evenly. A fourth disadvantage results from the fact that the batter is fluid. That is, the fluidity of liquid batter causes the batter to drip and run off the food piece after it is coated. This dripping and running off causes serious problems in the handling of liquid batters on production machinery including uneven thickness of liquid batter on the food piece and considerable waste and mess. Moreover, the liquid batter coated food piece must either be immediately fried to set the coating or covered over with some particulate dry material such as cracker crumbs.

Because of the difficulty in handling conventional batter coated food products, it is customary for the food processor to immediately fry the product after application of the coating and thereby incur the cost of frying the product and the increased cost of freezing the hot fried product. Moreover, since the consumer must reheat the precooked food product prior to eating, there is an appreciable loss in the eating qualities of both the food substrate and the coating. Moreover, when the liquid batter coated food product is fried, the dripping, running liquid creates "tailings" as the coating is set by the hot fat. These "tailings" are unsightly, brown unevenly, and often break or fall off into the frying fat resulting in accelerated frying fat breakdown.

It is an object of the present invention to provide novel comestible coating compositions.

It is another object of the present invention to provide novel batter compositions which are highly viscous, adherent and dripless when applied to a food substrate.

Yet another object of the present invention is to provide novel batter compositions which may be frozen on a food substrate prior to any cooking step.

A further object of the present invention is to provide novel methods of applying batter coatings to a food substrate which are continuous and adherent and may be subjected to further handling without significant loss of coating.

The above, as well as other objects, features and advantages of the invention are accomplished by the discovery of novel dry coating mix compositions which include gelatinized starch in an amount sufficient to form a continuous, adherent coating on a food substrate when placed in contact with a fluid. It has now been discovered that a wide variety of batter compositions may be formulated and applied to a food substrate without the necessity of immediate cooking and without the undesirable loss of coating which has heretofore accompanied the handling of coated food products. Although gelatinized materials have been utilized in prior art batter compositions to modify the viscosity or texture of the batter, and to increase the adhesion of a fried batter to a food substrate, it has never been recognized prior to the present invention that when a gelatinized starch is employed in sufficient quantities, it exhibits the unique characteristics of absorbing a sufficient amount of fluid to form a highly viscous, dripless, adherent, continuous batter coating. Although the amount of gelatinized starch which is required to achieve the objects of the invention will vary depending upon the nature and amount of other ingredients in the composition, the utilization of at least 3 to 5 wt. percent of gelatinized starch is critical to the formation of a continuous matrix or film embodying the coating. The source of gelatinized starch employed in the compositions of the invention is not critical and a wide variety of materials may be employed such as modified or pre-gelatinized starches derived from cornstarch rice starch, potato starch, and preferably wheat starch, all of which may be used alone or in combination with each other.

The present invention also contemplates a novel method of applying batter coating to a food substrate in which a dripless batter is formed directly on the substrate thereby avoiding the dripping and coating loss problems of prior art fluid batters. Contrary to the normal procedure of formulating a fluid batter mix and dipping the food piece in the batter, the coatings of the present invention are applied by dipping the food piece in a fluid and thereafter dipping the wet food piece in a dry coating mix composition which includes the gelatinized starch source. Sufficient fluid from the food piece is absorbed by the gelatinized starch in the coating mix to cause the coating to form a film and adhere to the food piece although the bulk of the coating is still a relatively dry powder. The coated piece is thereafter immersed in a fluid and additional amounts of fluid are absorbed so as to form a highly viscous, dripless, adherent batter directly on the food piece. It is a surprising feature of the invention that a significant amount of fluid in the range of 50 to 150 wt. percent e.g. 80 to 150 wt. percent, of the dry coating composition weight is absorbed by the gelatinized starch thereby causing the formation of a uniform adherent coating utilizing relatively small amounts of coating composition. Thus the final coating comprises approximately 40 to 60 wt. percent fluid. Moreover, the rate of absorption of fluid is rapid and as a result no significant amount of dry coating composition falls from the food piece into the fluid during the immersion step.

Although water is the preferred fluid employed in the formation of the dripless batter coatings of the invention, a wide variety of fluids can be employed without departing from the spirit of the invention. For example, dripless batters may be formed which employ fluids such as milk; whey; fruit juices; aqueous solutions or dispersions of salts, sugars, gums, cereal solids, proteinaceous extracts, flavoring, spices and food colors; and other similar fluid materials or combinations of materials. Indeed, by employing fluids containing such additional ingredients, the method of the invention provides the additional advantage of achieving a variety of distinctive flavor, color or texture effects when the fluid is absorbed by the dry coating to form the dripless batter directly on the food piece.

The present method invention also contemplates a repetition of the coating procedure where heavier coatings are desired. Thus, the dripless batter coated food piece may be re-dipped in dry coating mix and thereafter re-immersed in a fluid. Regardless of the number of coating steps employed, the coating is strongly adherent to the food piece and the product may be subjected to subsequent handling such as conveying, freezing and packing without damage to the coating.

It will be readily understood by those persons skilled in the art that a wide variety of mechanical means may be employed to accomplish the process steps of the invention. Thus, for example, the bare food piece may be moved through a fluid bath, sprayed or cascaded with fluid, and thereafter tumbled, cascaded, or immersed in the dry mix so as to form a powder coating around the food surface. The powder coated food piece may then be moved by any conventional means through a fluid bath wherein the percentage of fluid heretofore described is absorbed to form the thick, viscous batter coating.

The novel compositions of the invention may be formulated to result in either bakeable or fryable batter compositions. The novel fryable batter of the present invention comprises the following formulation, the percentages given with each ingredient representing the weight percent of that component in a dry coating composition:

| Ingredient | Weight percent | |
|---|---|---|
| | Preferred range | Broad range |
| Ungelatinized starch source | 60 to 70 | 28 to 97. |
| Gelatinized starch | 15 to 25 | 3 to 45. |
| Leavening acid | 3 to 5 | 0 to 8. |
| Sodium bicarbonate | 3 to 5 | 0 to 8. |
| Salt | 3 to 5 | 0 to 10. |
| Browning agent | 2 to 4 | 0 to 8. |

All of the above ingredients may be derived from conventional sources which are well known to the persons skilled in this art. The ungelatinized starch, for example, may be derived from cornstarch, wheat starch, corn flour, wheat flour, rye flour, rice flour, oat flour or combinations thereof. Typical leavening acids are sodium aluminum phosphate, sodium pyrophosphate, calcium phosphate, sodium phosphate, cream of tartar, tartaric acid, glucona delta lactone or combinations of any of these materials. Similarly, any typical salt such as sodium chloride, potassium chloride, calcium chloride, or a combination may be employed. The browning agents contemplated for use in the composition include such materials as dextrose, sucrose, corn syrup solids, lactose, fructose, whey powder, milk powder or combinations of these ingredients. In addition, a wide variety of spices and flavoring agents may be added as desired.

When the above batter coated food products are subjected to frying, either after freezing and shipping to the consumer or immediately after formation of the batter on the food piece, a puffy, expanded, golden brown fried coating is formed on the food piece. This coating is characterized by its continuity and its unusually strong adherence to the food substrate.

The present invention also contemplates the preparation of dry compositions particularly adapted for the production of a bakeable batter directly on the food piece. The formulation for such a batter is set forth in tabular form herein below, the percentages given with each ingredient representing the weight percent of that ingredient in a dry coating composition.

| Ingredient | Weight percent | |
|---|---|---|
| | Preferred range | Broad range |
| Expanded gelatinized particles | 18 to 25 | 10 to 40. |
| Shortening beads | 30 to 35 | 15 to 50. |
| Ungelatinized starch source | 14 to 16 | 10 to 30. |
| Gelatinized starch source | 20 to 25 | 5 to 50. |
| Salt | 3 to 5 | 0 to 9. |
| Sodium bicarbonate | 4 to 6 | 0 to 8. |
| Leavening acid | 4 to 6 | 0 to 8. |
| Browning agent | 0.5 to 2.0 | 0 to 8. |
| Crisping agent | 0.25 to 1.0 | 0 to 10. |

The expanded gelatinized particles which are useful in the formation of a bakeable batter include cooker extruder crumbs, bread crumbs, cracker meal, muffin crumbs, corn-flake crumbs, or any conventional crumb source normally employed in forming bread type coatings. Similar materials may also be employed, although in smaller amounts, in the formation of a fryable batter where it is desired to change the texture or appearance of the fried product.

The shortening beads are added to the bakeable batter in order to provide the fat normally supplied by frying fat when the product is fried since such fat is necessary for flavor. One source of beads suitable for use in the invention comprise animal or vegetable shortening with a melt point in a range of 119–125° F. Such beads are normally formed from a spray cooling process which yields beadlets having the physical characteristics of a coarse free-flowing powder.

Typical crisping agents for the composition include algae gum and modified starches. The remaining ingredients are similar to those described for the fryable batter composition.

As in the case of the fryable batter, the bakeable batter is characterized by exceptionally high fluid absorption and the batter is formed directly on the food piece by the method of the invention. The baked coatings are also characterized by their continuity and strong adherence to the food piece but have a less puffy or expanded appearance than the fried coated products.

The invention will be further understood by reference to the following illustrative examples.

EXAMPLE 1

A conventional puff batter mix and the dripless puff batter mix of the invention were prepared in order to evaluate and compare their properties. The formulations were as follows:

Conventional Puff Batter Mix

| Ingredient: | Dry, wt. percent |
|---|---|
| Wheat flour | 60.0 |
| Corn flour | 20.0 |
| Sugar | 10.0 |
| Salt | 3.6 |
| Sodium bicarbonate | 1.3 |
| Sodium acid pyrophosphate | 1.8 |
| Nonfat dry milk | 2.8 |
| Dried whole egg | 0.5 |
| Water | --- |

Dripless Puff Batter Mix

| Ingredient: | Wt. percent |
|---|---|
| Cornstarch | 63.5 |
| Gelatinized wheat starch | 20.7 |
| Salt | 4.3 |
| Sodium bicarbonate | 4.8 |
| Sodium aluminum phosphate | 4.6 |
| Spice | 0.7 |
| Dextrose | 1.4 |

The conventional batter mix was employed using two different techniques. In the first technique, the dry composition was mixed with an equal amount of water to form a liquid batter. A food piece such as chicken was dipped into the liquid batter and thereafter immediately transferred into a bath of hot frying fat maintained at 370° F. The piece was fried for 3 to 4 minutes to set the coating and to cook the food piece. Although the finished food piece had a continuous puffy surface and golden brown color, it was observed that the batter freely dripped and ran off the food piece and a significant amount of batter was observed floating in the frying fat.

In the second technique of employing the conventional batter mix, the food piece was moistened with water and the piece was then tumbled in the dry mix. Thereafter the dry coated piece was dipped in water for 5 to 7 seconds and then transferred to a fryer where it was fried for 3 to 4 minutes. A significant amount of batter fell off into the fryer. It was further observed that relatively little dry mix adhered to the wet food piece during the tumbling step; a significant amount of mix washed off during the water dip step; and the coating was wet and runny after the dip steps. In addition, the fried piece had a discontinuous, uneven coating which was blotchy in color and texture.

The dry batter mix of the invention was employed in the novel technique of the invention which involved forming the batter on the food piece by dipping the wet food piece in water, tumbling the wet piece in the dry mix and thereafter dipping the dry coated piece in water, all in the same fashion as previously described in connection with the second technique attempted with the conventional batter mix. The batter formed on the food piece uniformly and evenly and did not drip or run off. It was in such condition that it could readily have been frozen at this point without adverse effect. The coated piece was fried in fat for 3 to 4 minutes at 370° F. No significant batter fall off was observed and the product had a golden brown continuous puffy surface with uniform surface texture.

The results of these experiments clearly indicate that the composition and method of the invention provide a highly acceptable product without the disadvantages of a dripping runny batter coating.

Having thus described the general nature as well as specific embodiments of the invention, the true scope will now be pointed out in the appended claims.

What is claimed is:

1. A method of forming a continuous adherent batter on a food piece comprising wetting a bare food piece with a fluid, coating said food piece with a dry composition comprising 3 to 45 wt. percent gelatinized starch, 28 to 97 wt. percent ungelatinized starch, 0 to 8 wt. percent leavening acid, 0 to 8 wt. percent sodium bicarbonate, 0 to 10 wt. percent salt and 0 to 8 wt. percent browning agent to form a continuous adherent coating about said food piece, treating said coated food piece with a fluid for a time sufficient for said coated food piece to absorb 50 to 150 wt. percent of fluid, based on the weight of said dry composition, whereby a viscous batter is formed directly on said food piece.

2. The method of claim 1 wherein said fluid is water.

3. The method of claim 2 wherein said batter coated food piece is fried for a time sufficient to set said coating.

4. The method of claim 2 wherein said batter coated food piece is frozen.

5. The method of claim 2 wherein a second coating of said dry composition is applied to said batter coated food piece and thereafter said food piece is again treated with water for a time sufficient for said coated food piece to absorb an amount of water sufficient to form an adherent, viscous batter directly on said food piece.

References Cited

UNITED STATES PATENTS

| | | | |
|---|---|---|---|
| 3,078,172 | 2/1963 | Libby | 99—1 X |
| 3,169,069 | 2/1965 | Hanson et al. | 99—194 |
| 3,236,654 | 2/1966 | Lipka et al. | 99—94 X |
| 3,514,294 | 5/1970 | Klug et al. | 99—1 |
| 3,527,646 | 9/1970 | Scheick et al. | 99—166 |

HYMAN LORD, Primary Examiner

U.S. Cl. X.R.

99—1, 100, 107, 111, 168, 169